US006296786B1

(12) United States Patent
Wada et al.

(10) Patent No.: US 6,296,786 B1
(45) **Date of Patent: *Oct. 2, 2001**

(54) TREATED WASTE, METHOD FOR MAKING THE SAME AND APPARATUS FOR MAKING THE SAME

(75) Inventors: Ryutaro Wada; Tsutomu Nishimura, both of Osaka; Tsuyoshi Imakita, Kobe; Yoshitaka Kurimoto, Kobe; Yasushi Sugimura, Kobe, all of (JP)

(73) Assignee: Kabushiki Kaisha Kobe Seiko Sho., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,349

(22) Filed: Jul. 28, 1998

(30) Foreign Application Priority Data

Jul. 28, 1997 (JP) .................................................. 9-201283

(51) Int. Cl.[7] .................................................. C09K 11/04

(52) U.S. Cl. ......................... 252/625; 405/128; 405/129; 588/14; 588/15

(58) Field of Search .................................. 405/128, 129; 588/14, 15; 252/625

(56) References Cited

U.S. PATENT DOCUMENTS

| | | | | |
|---|---|---|---|---|
| 3,262,885 | * | 7/1966 | Rushbrook et al. | 588/14 |
| 4,017,417 | | 4/1977 | Clarke et al. | 252/301.1 |
| 4,088,737 | * | 5/1978 | Thomas et al. | 588/14 |
| 4,661,291 | * | 4/1987 | Yamasaki et al. | 588/14 |
| 5,461,185 | * | 10/1995 | Forsberg et al. | 588/11 |
| 5,826,203 | * | 10/1998 | Fukumoto et al. | 588/15 |

FOREIGN PATENT DOCUMENTS

| | | |
|---|---|---|
| 0 327 271 | 8/1989 | (EP) . |
| 96 18196 | 6/1996 | (WO) . |

OTHER PUBLICATIONS

Couture et al., Nuclear and Chemical Waste Management, vol. 4, No. 4, 1983, pp. 301–306.

Patent Abstracts of Japan, vol. 1996, No. 07, Jul. 31, 1996.

* cited by examiner

*Primary Examiner*—Jill Warden
*Assistant Examiner*—Monique T. Cole
(74) *Attorney, Agent, or Firm*—Reed Smith Hazel & Thomas LLP

(57) ABSTRACT

A treated waste has been treated so as to prevent diffusion of a substance to be disposed, of e.g., radionuclide "I", that tends to occur when the waste is disposed of in reducing environment at an ultra-deep underground. The treated waste has a low-resolution compound containing "I", e.g., "AgI", and a high oxygen potential agent having a higher oxygen potential than the compound, e.g., "$Fe_2O_3$". Ionization of the substance to be disposed, attributable to reduction of the compound, can be suppressed over a long time.

12 Claims, 4 Drawing Sheets

TREATED WASTE, METHOD FOR MAKING THE SAME AND APPARATUS FOR MAKING THE SAME

BACKGROUND OF THE INVENTION

1. Field of the Invention

The present invention relates to a treated waste disposed of in ultra-deep underground, a method for making it and, an apparatus for making the treated waste.

2. Description of the Related Art

Recently, a method for treating waste such as a high level radioactive waste which adversely affects the environment or a human body for a long period is performed by burying or storing the wastes in the ultra-deep underground. It is important that the waste remains in the originally treated condition for a long period in order to avoid leakage and diffusion of substances to be disposed within the waste to the surroundings after disposal in the ultra-deep underground.

Therefore, a variety of procedures have been proposed and developed for stabilizing the wastes. For example, it is known from Japanese Examined Patent Publication No. 57-960 that the waste is treated by a process having the steps of filling a space portion in a container with incombustible powder, sealing the container with deaeration, and performing a hot isostatic pressing process to transform the treated waste being a block state. According to this processing method, oxidization or nitriding of the treated waste is inhibited by means of the incombustible powder so that it is possible to maintain a strong binding strength of the treated waste obtained by solidifying into theoretical density state having reduced volume for a long period of time.

Further, in Japanese Unexamined Patent Publication No. 8-20557, there is disclosed a method for producing treated waste by solidifying waste using water glasses added by a hydroxide or an oxide of an alkaline metal. In this procedure, it is possible to maintain the solidified state for a long period by maintaining an alkaline condition by means of the alkaline metal and by inhibiting the production of water of crystallization of an inorganic salt.

However, even though the treated waste stays in the originally treated condition by inhibiting oxidization or nitriding of the treated waste, or by inhibiting the production of water of crystallization, there is a problem that a substance to be disposed in the waste is ionized and transformed into an easily dissolving configuration in ground water, because the environment in the ultra-deep underground has reducing conditions due to low oxygen concentration. As a result there is a problem that the substance to be disposed in the waste leaks into the surroundings at an early stage.

As shown in FIG. 4, the environment on the ground has oxidizing conditions because of high oxygen concentration high Eh), on the other hand the enviroment in the ultra-deep underground has reducing conditions (low Eh), because its oxygen concentration is significantly lower than that on the ground.

Thus, when the waste contains the substance "I" (radioactiveiodine) to be disposed of the form of a metal compound "AgI" and exists on the ground having the oxidizing conditions, ionization of "Ag" and "I" in accordance with a reaction $AgI \rightarrow Ag^+ + I^-$ and consequent dissolution in water will be substantially avoided because of the low solubility ($[Ag^+][I^-]=10^{-16}$), even if water is brought into contact with "AgI".

On the other hand, when "AgI" exists in the ultra-deep underground where there are reducing conditions, a reducing agent causes the following reaction:

$$AgI + e^- \rightarrow Ag^0 + I^-$$

and stimulates the ionization of "I".

Although the treated waste maintains the originally treated configuration, a large amount of ionized "I" is dissolved in the ground water in the case the treated waste is penetrated by the ground water according to the following reaction:

$$6AgI + 3H_2O \rightarrow 6Ag^0 + IO_3^- + 6H^+$$

so that "I" leaks and diffuses in the surroundings through the ground water at an early stage.

SUMMARY OF THE INVENTION

Accordingly, with attention to reducing conditions in the ultra-deep underground, it is an object of the present invention to provide treated waste, wherein the treated waste inhibits ionization of the substance to be disposed of caused by reduction of a metal compound, even when the treated waste is disposed of in an environment having reducing conditions. The invention also provides a method and an apparatus for making such a treated waste.

To this end, according to one aspect of the present invention, there is provided a treated waste treated so as to suppress release of a substance to be disposed of when the waste is disposed of in the ultra-deep underground where there are reducing conditions, comprising: a compound containing the substance to be disposed; and a high oxygen potential agent having a higher oxygen potential than the compound.

In accordance with these features of the invention, the compound in the waste immediately after the treatment, containing the substance to be disposed of, is not affected by any reducing condition, even when the waste is exposed to the reducing conditions at ultra-deep underground. This owes to the fact that the high oxygen potential agent serves to provide an oxidizing condition for the waste. This effectively suppresses reducing tendency of the compound, thus preventing ionization and release of the substance to be disposed of from the compound immediately after the disposal. When the reducing effect on the treated waste caused by a reducing agent derived from the reducing condition has become substantial with times the high oxygen potential agent is preferentially bonded to electrons, so as to prevent reduction of the compound containing the substance to be disposed of, whereby ionization of the substance to be disposed of is retarded. Therefore, the treated waste can retain the substance to be disposed of in the form of the compound for a long time. As a consequence, dissolution of the substance in ground water is substantially eliminated, even when the waste is penetrated by the ground water. It is thus possible to suppress release of the substance to be disposed of for a long period.

The compound and the high oxygen potential agent may have been treated to form solidificates.

According to another aspect of the present invention, there is provided a method for making a treated waste of the type set forth above, the method comprising effecting a solidification treatment for solidifying the treated waste. The solidification treatment serves to reduce the area of contact with the reducing atmosphere, thus further suppressing reduction of the treated waste.

The solidification treatment may be performed by filling the solidifying material. In this case, the treated waste can be obtained by a simple process of filling the solidifying material.

Alternatively, the solidification treatment may be performed using a hot isostatic pressing process.

In this case, the waste is solidified while reducing its volume, thus realizing a further decrease in the area of contact with the reducing atmosphere, thereby greatly suppressing the reduction of the compound under the reducing environment. The hot isostatic pressing process, when conducted at an appropriate temperature, forms a layer on the surface of the solidified waste. The substance to be disposed, even when ionized and freed from the compound, is retained in the waste by the layer which serves as a retainer layer.

According to still another aspect of the present invention, there is provided an apparatus for making a treated waste treated so as to suppress release of a substance to be disposed of when the waste is disposed of in the ultra-deep underground, where there are reducing conditions, comprising: means for mixing a compound containing the substance to be disposed of and a high oxygen potential agent having a higher oxygen potential than the compound to form a mixture; and means for applying a pressure by means of a hot isostatic pressing process to the mixture.

It is thus possible to prepare the treated waste by using a simple system which has the mixing process and the pressing process.

DESCRIPTION OF THE PREFERRED EMBODIMENT

Figure 1:
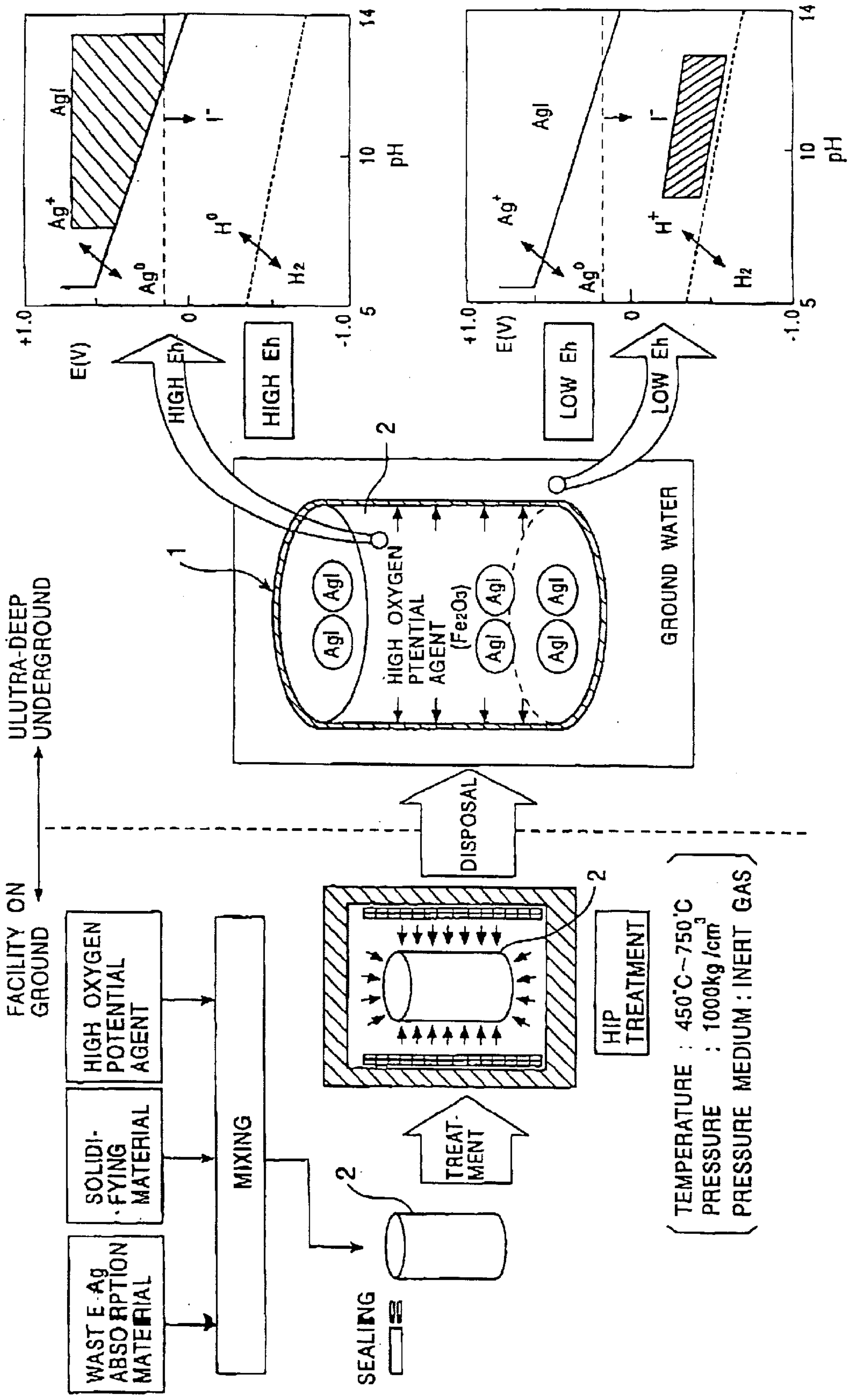
FIG. 1 is a schematic representation showing a process for its treated waste and a state after disposal.
Figure 2:
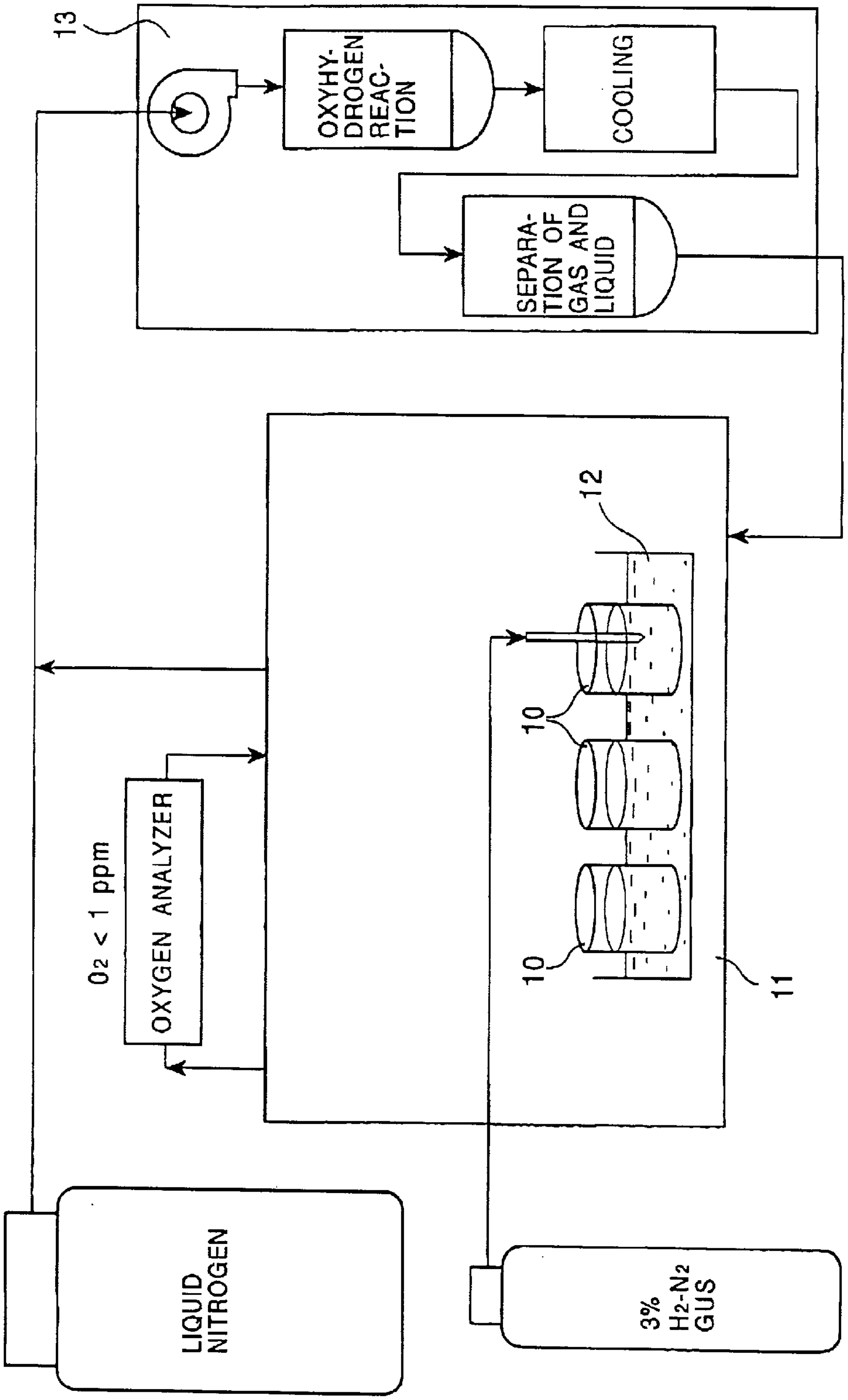
FIG. 2 is a schematic representation showing a method for testing the treated waste.
Figure 3:
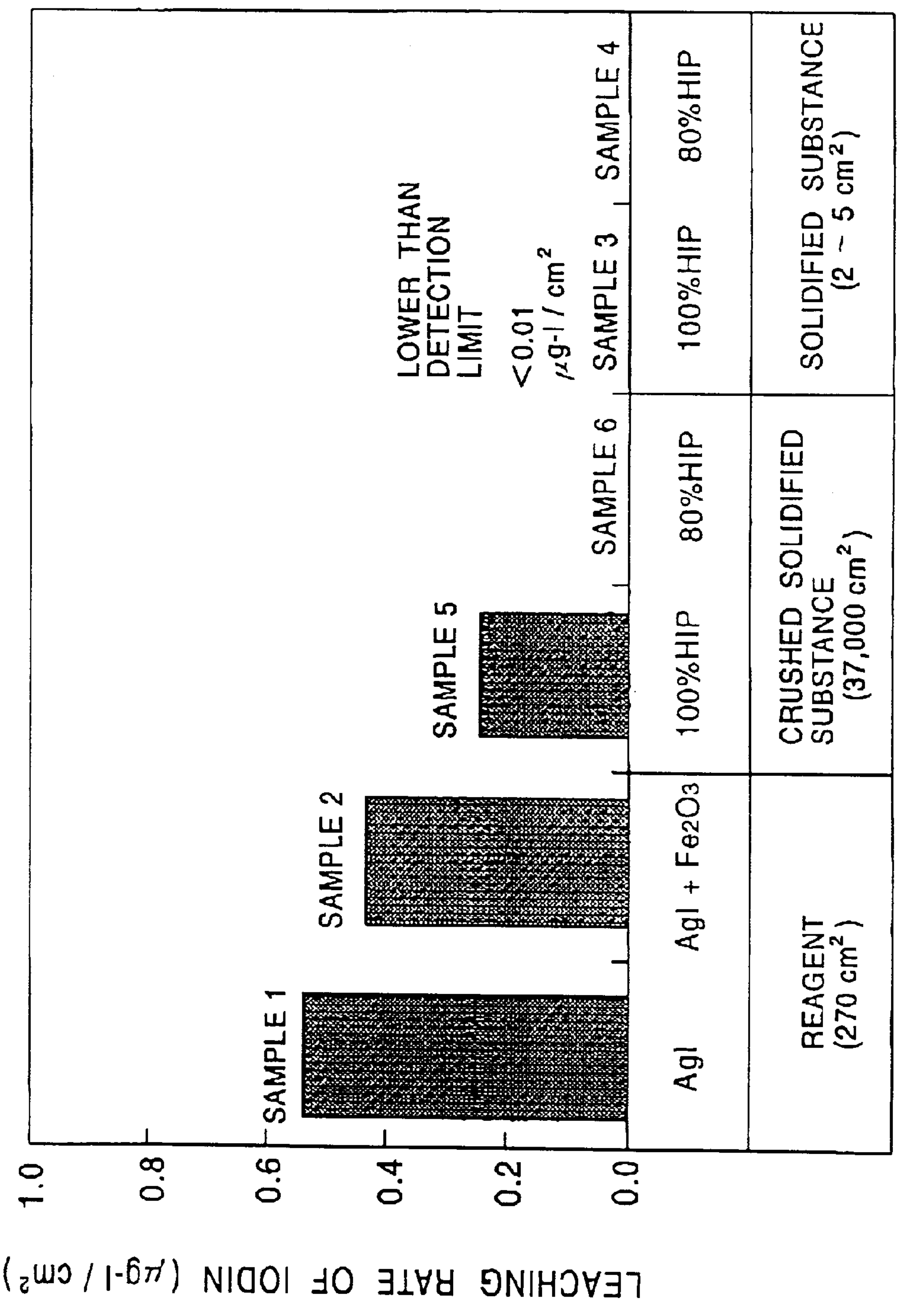
FIG. 3 is a graph showing a leaching rate of iodine of each sample.
Figure 4:
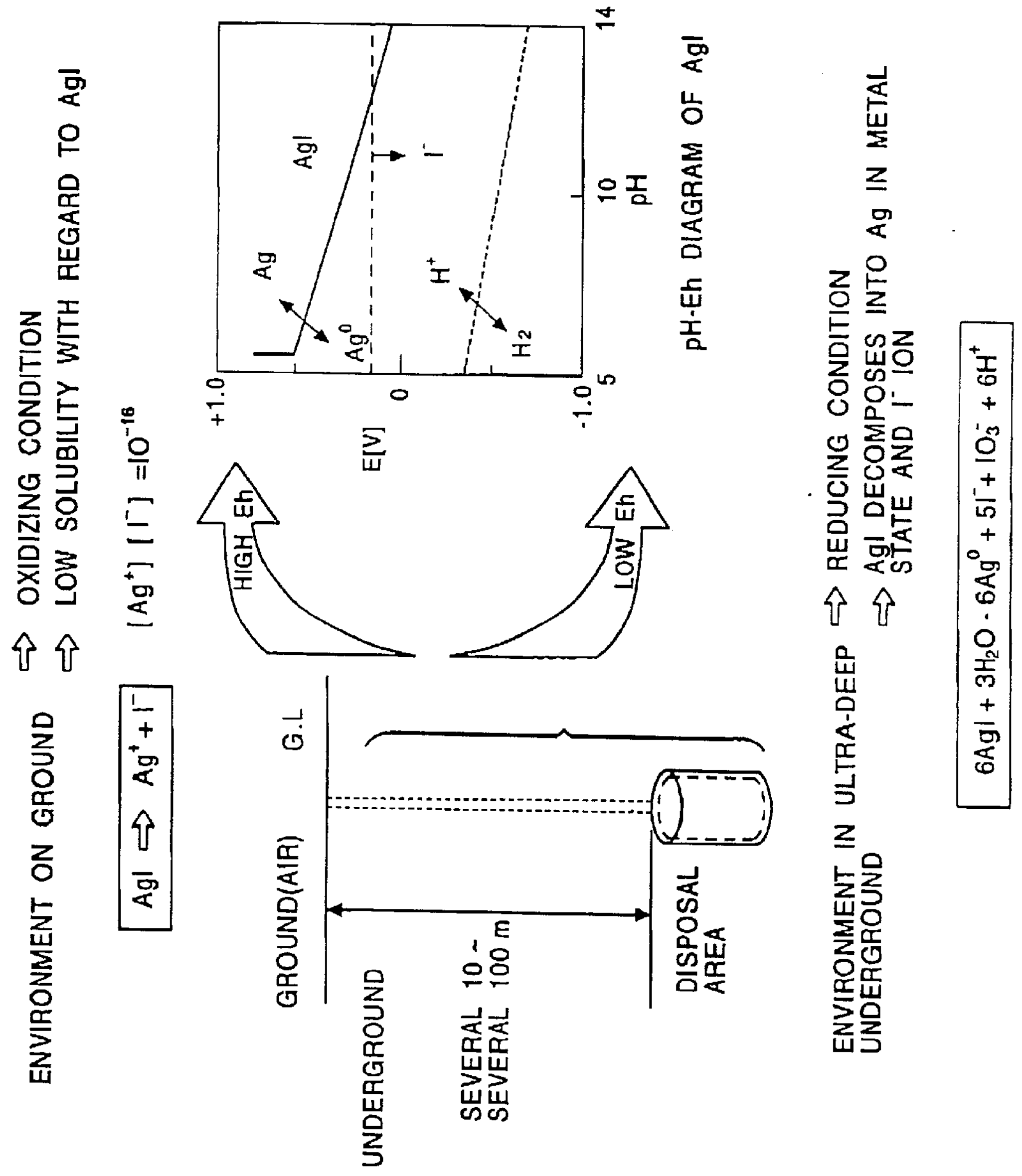
FIG. 4 is a schematic representation showing a state of the treated waste in ultra-deep underground.

Referring to FIGS. 1 to 3, an embodiment of this invention will be described as follows.

Treated waste according to this embodiment includes "AgI", which is a chemical compound containing a radionuclide such as $^{129}$I, a high oxygen potential agent "$Fe_2O_3$" which has a higher oxygen potential than "AgI", and a solidifying material which solidifies the "AgI" and "$Fe_2O_3$" to form solidificates, as shown in FIG. 1. The treated waste 1 is produced by means of an apparatus which includes a mixing apparatus 21, which mixes "AgI" and "$Fe_2$ $O_3$", and a compressor 22 to press the mixture mixed by means of the mixing apparatus 21 operating as a hot isostatic pressing processing unit so that production is obtained by using an apparatus having a simple construction.

The oxygen potential described above represents the degree of ease of binding with an electron $e^-$. "$Fe_2O_3$" having a very high oxygen potential allows the inner conditions of the solidificates to be the same as the conditions on the ground being under oxidizing conditions with a high oxidation-reduction potential (high Eh) and binds predominantly with a reducing agent within the solidificates, so that reduction of "AgI" by the reducing agent is inhibited.

A solidifying material that cures "AgI" and "$Fe_2O_3$" comprises oxide glasses such as borosilicate glass or CAS glass, and causes an increase in the mechanical strength of the solidificates by vitrification of the solidificates. Cement may also be available as the solidifying material. Additionally, the solidificates are hermetically sealed in a capsule 2 made of a metal such as "Ti" or "Cu" so as to be isolated from water caused by moisture and ground water which may exist outside the capsule 2.

Further, the treated waste 1 is treated with a hot isostatic pressing process (HIP process) in order to cause an even further increase in the mechanical strength of the solidificates and to reduce the volume. The conditions of the HIP process are set for the application of pressure of 1000 kg/cm$^3$ using an inert gas such as nitrogen or argon as the pressure medium under a processing temperature of 450–750° C. Then, the treated waste 1 treated with the HIP process under the above conditions has a layer on the surface of the solidificates provided by the high temperature process. This surface layer prevents release of "I" by possessing a retentive function of nuclides in which the diffusion coefficient is $10^{-4}$ times smaller than that of the inside.

A method for making the treated waste 1 will be described in accordance with the above construction. First, when a waste Ag absorption material which absorbs "$AgIO_3$" or "AgI" is emitted as waste from nuclear power facilities such as a nuclear power plant or a reprocessing facility, "$Fe_2O_3$" is selected as a high oxygen potential agent having higher oxygen potential than "AgI" in order to inhibit reduction of "AgI" which is the compound contained in the waste Ag absorption material, the waste Ag absorption material and "$Fe_2O_3$" are mixed with the solidifying material comprising oxide glasses, and then, they are filled in the capsule 2.

Then, the capsule 2 is hermetically sealed by means of welding in such a manner that the filler material is isolated from any water which may exist outside. The material filling the capsule 2 is treated with the HIP process for vitrification that produces the solidificates and for simultaneous reduction of the volume, whereby the treated waste 1 is produced. In this case, the conditions of the HIP process are set for the application of pressure of 1000kg/cm$^3$ using an inert gas such as nitrogen or argon as the pressure medium under a processing temperature of 450–750° C. Under these conditions all the "$AgIO_3$" is converted to "AgI" and a layer, which possesses the function of retaining nuclides, is formed on the surface of the solidificates of the vitrified filler material. Therefore, the treated waste 1 produced by the above process is able to retain the configuration for a long period by means of the solidificates which are vitrified and reduced in volume.

Next, the processing of the treated waste 1 after the above procedure will be described.

The treated waste 1 produced by using the above processes is sealed in drums which are not shown in the Figures, then transferred to a disposal area in the ultra-deep underground, and disposed of. The disposed treated waste 1 exists under reducing conditions (low Eh), because the concentration of oxygen in the disposal area in the ultra-deep underground is low. When the "AgI" within the treated waste 1 reacts under the reducing conditions, ionized "I" is produced in a period just after the disposal according to the following reaction:

$$AgI+e^-\rightarrow Ag^0+I^-.$$

The vitrified solidificates within the treated waste 1 is under an oxidizing condition (high Eh) due to the high oxygen potential agent "$Fe_2O_3$". Therefore, since the environmental reducing conditions of the treated waste 1 do not affect the "AgI" just after the disposal, ionized "I" is not produced in the period immediately following the disposal. Additionally, although the reducing agent under the reducing conditions causes the inside of the treated waste 1 to react over time, the high oxygen potential agent “$Fe_2O_3$” binds predominantly to the reducing agent, so that the reduction of “AgI” by an electron $e^+$is inhibited, and then, the production of “$I^-$” is delayed. The layer possessing a function for retaining nuclides on the surface of the vitrified solidificates inhibits the release of “$I^-$”, even if “$I^-$” is produced in this way. Therefore, in a case in which the solidificates contact ground water through breakage of the capsule 2 covering the solidificates, the release amount of “$I^-$” into the ground water is small, so that environmental pollution due to the leak of “$I^-$” from the surroundings of the disposal area is significantly low.

Next, the fact that the high oxygen potential agent “$Fe_2O_3$” supresses the reduction of the substance to be disposed “AgI” will be explained by experimetal results.

First, Sample 1 comprising an “AgI” reagent and Sample 2 in which the “AgI” reagent and “$Fe_2O_3$” are mixed were prepared. The “AgI” reagent, borosilicate glass, and “$Fe_2O_3$” were mixed in the ratios of 100:0:0 and 18:5:15, respectively, after which solidificates were produced by the HIP process, so that a 100%HIP solidificate (Sample 3) including 100% “AgI” and an 80%HIP solidificates (Sample 4) including 80% “AgI” were prepared. Further, these Samples 3 and 4 were crushed, so that granulated 100% “AgI” crushed solidified substrate (Sample 5) and granulated 80% “AgI” crushed solidified substrate (Sample 6) were prepared.

Next, predetermined weights were sampled from the above Samples 1–6 and surface areas were measured. Then, as shown in FIG. 2, each sample was weighed in a respective beaker 10 and a solution containing a reducing reagent ($Na_2S_2O_6.2H_2O$) dissolved in distilled water was added into each beaker 10 to make 6.2 mmol/l. Then, the Samples 1–6 were allowed to stand for incubation at 35° C. by setting each beaker into an incubator 12 within a gloved box 11. After this, the conditions in the gloved box 11 were set to be similar to the environmental conditions of the ultra-deep underground, in which the oxygen concentration is low (less than 1 ppm), by operating a gas purifier apparatus 13 and also by adding a mixed gas including $3\%H_2$—$N_2$ into each beaker 10 at a rate of addition of 10min/week. After the experiment under these conditions was performed for 7 days, an amount of leaching iodine ($\mu$g/ml) dissolved into the solution was obtained and the leaching rate of iodine ($\mu$g-I/cm$^3$) was also obtained.

As a result, as shown in Table 1 and FIG. 3, with regard to the relationship between Samples 1 and 2 as states of the reagent, the leaching rate of iodine of Sample 1 which did not include the high oxygen potential agent “$Fe_2O_3$” is represented as 0.56, and on the other hand, that of Sample 2 which did include “$Fe_2O_3$” is represented as 0.44. Hence, the leaching rate of iodine of Sample 2 was lower than that of Sample 1. With regard to the relationship between Samples 5 and 6 as cases of HIP crushed solidified substrates, the leaching rate of iodine of Sample 5 which did not include “$Fe_2O_3$” was 0.24, and on the other hand, that of Sample 6 which did include “$Fe_2O_3$” was lower than the detection limit. Hence, the leaching rate of iodine of Sample 6 was lower than that of Sample 5.

Thus, it is clear that cases in which “$Fe_2O_3$” was included showed a reduced leaching rate of iodine. The construction may be only a mixture with “AgI” such as Sample 2, or also may be the crushed solidified substrate state by means of the hot isostatic pressing process (HIP process). Additionally, with regard to the relationship between the solidificatess Samples 3 and 4, the leaching rate of iodine of both were lower than the detection limit, so that the effect of “$Fe_2O_3$” could not be confirmed. Compared with the result of Samples 5 and 6 which were the crushed-type samples of the solidified substrate-type samples, Samples 3 and 4, it is obvious that the leaching rate of iodine of Sample 4 including “$Fe_2O_3$” is lower than that of Sample 3.

Further, it is clear as shown in the relationship between Samples 1, 3, and 5, the HIP process can reduce the leaching rate of iodine, and Sample 5 which is crushed after the HIP process shows a lower leaching rate of iodine than Sample 1 without the process. Since the Samples 2, 4, and 6 in which “$Fe_2O_3$” is added to the corresponding Samples 1, 3, and 5 show a lower leaching rate of iodine than Samples 1, 3, and 5, the HIP solidificates containing “$Fe_2O_3$” is the best treated form. It is clear that this treated form can decrease the leaching rate of iodine for a long period, even if external forces crush the solidificates after the treatment.

TABLE 1

| Sample | Test material | Surface area cm$^2$ | Leaching amount of iodine $\mu$g/ml | Leaching rate of iodine $\mu$g - 1/cm$^2$ |
|---|---|---|---|---|
| 1 | AgI reagent | 270 | 0.15 | 0.56 |
| 2 | AgI reagent + $Fe_2O_3$ | 270 | 0.12 | 0.44 |
| 3 | 100% HIP solidificates | 2 | .<0.01 | — |
| 4 | 80% HIP solidificates | 5 | <0.01 | — |
| 5 | 100% HIP Crushed solidificates | 37000 | 9.01 | 0.24 |
| 6 | 80% HIP Crushed solidificates | 37000 | <0.01 | — |

As shown in FIG. 1, the treated waste 1 according to this embodiment has been treated in such a manner as to suppress leakage of the radionuclide “I” (the substance to be disposed) from the waste when the same is disposed in the ultra-deep underground having reducing conditions. The waste comprises “AgI”(the compound) which exhibits low solubility in the air containing “I” and “$Fe_2O_3$” (the high oxygen potential agent) which has a higher oxygen potential than “AgI”.

Thus, when the treated waste 1 is exposed to the reducing conditions of the ultra-deep underground, the reducing conditions do not effect the “AgI” within the treated waste 1 just after the disposal, because “$Fe_2O_3$” causes the treated waste 1 to be in oxidizing conditions. And, since the reduction of “AgI” is inhibited, “I” in the “AgI” does not ionize and dissolve. When an electron $e^-$reacts with the treated waste 1 under the reducing conditions over time, “$Fe_2O_3$” binds to the reducing agent predominantly and reduction of “AgI” by the reducing agent is inhibited, so that the ionization of “I” will be delayed. Therefore, since the treated waste 1 retains “I” as “AgI” showing the low dissolving state for a long period, the dissolution amount of “I” in ground water is very low and the diffusion of “I” can be suppressed, even if the treated waste 1 is penetrated by the ground water.

According to this embodiment, the case in which the radionuclide “I” being the substance to be disposed of is retained as the metal compound “AgI” and “$Fe_2O_3$” is used as a high oxygen potential agent is described as an example, and is not intended as a definition of the limits of the invention. In other words, the substrate to be treated may be retained in a compound other than a metal compound, may be a radionuclide other than “I”, and also may be a heavy metal which causes adverse effects on the environment. Additionally the high oxygen potential agent may have a higher oxygen potential than the compounds such as the metal compounds so as to bind predominantly to the electron $e^-$. For example tungstic oxide "$WO_3$", vanadium pentoxise "$V_2O_5$" or silver (I) oxide "$Ag_2O$" may be used.

Method of producing the treated waste 1 according to this embodiment includes a solidification treatment for solidifying the waste 1. This solidification treatment serves to decrease the area of contact with the reducing atmosphere, so that the reduction of "AgI" in the treated waste 1 is further suppressed.

The solidifying process is performed by filling a solidifying material, which may be an oxide glass such as borosilicate glass or CAS glass, or may be cement and then effecting an HIP. However, it is not essential to conduct both the solidification by filling the solidifying material and the solidification by HIP. In other words, either the solidification using the solidifying material alone or solidification by HIP alone may be conducted. When the solidifying treatment by filling with the solidifying material is performed, the treated waste 1 can be obtained by means of a simple treatment such as filling with the solidifying material. When the solidifying treatment is performed by means of the HIP process, the treated waste 1 is solidified with reduced volume, so that the reduction of "AgI" under the reducing conditions is significantly suppressed, because the area in contact with the reducing atmosphere can be decreased.

Further, when the HIP process is performed, a layer can be formed on the surface of the solidificates because of the processing temperature. Thus, a heating process to make the layer can be omitted. The heating process may be preferably performed to form the layer when the HIP process is not carried out. The reason is as follows. When the substance to be disposed is radionuclide "I" similar to this embodiment, the ionized "$I^-$" derived from "AgI" can be retained within the solidificates due to the layer of the surface.

What is claimed is:

1. A treated waste treated so as to suppress release of a radioactive substance to be disposed when said waste is disposed of underground under reducing conditions, comprising:

a compound containing said radioactive substance to be disposed; and an inhibiting agent made of metal oxide for oxidizing a reducing agent so as to inhibit said reducing agent from reducing said compound that causes said radioactive substance to be released from said compound, wherein said metal oxide inhibiting agent is formed to oxidize said reducing agent whereby said reducing agent predominately reduces said metal oxide inhibiting agent in preference over said compound.

2. The treated waste according to claim 1, wherein said compound and said inhibiting agent have been treated to be solidificates.

3. A treated waste according to claim 1 which further comprises a solidifying material which solidifies the compound containing the radioactive substance and the inhibiting agent into solidificates.

4. A treated waste according to claim 1 wherein the radioactive substance is radioactive iodine.

5. A treated waste according to claim 4 wherein the compound is AgI.

6. A treated waste according to claim 1 wherein the inhibiting agent is a material selected from the group consisting of $Fe_2O_3$, $WO_3$, $V_2O_5$, and $Ag_2O$.

7. A treated waste according to claim 6 wherein the compound is AgI.

8. A treated waste according to claim 3 wherein the solidifying material causes an increase in mechanical strength of the solidificates by vitrification.

9. A treated waste according to claim 8 wherein the solidifying material is borosilicate glass or CAS glass.

10. A method for making a treated waste treated so as to suppress release of a radioactive substance to be disposed of underground under reducing conditions, said waste comprising a compound containing said radioactive substance to be disposed, and an inhibiting agent made of metal oxide for oxidizing a reducing agent so as to inhibit said reducing agent from reducing said compound that causes said radioactive substance to be released from said compound, said method comprising solidifying said treated waste; and inhibiting said reducing agent from reducing said compound so as to cause said radioactive substance to be released from said compound, wherein said metal oxide inhibiting agent is formed to oxidize said reducing agent whereby said reducing agent predominately reduces said metal oxide inhibiting agent in preference over said compound.

11. A method as claimed in claim 10 wherein solidifying is performed by filling with solidifying material.

12. A method as claimed in claim 10 wherein solidifying is performed using a hot isostatic pressing process.

* * * * *